Aug. 5, 1958     H. G. HUTCHINSON     2,845,967
GUIDE BAR FOR CHAIN SAWS
Filed Aug. 30, 1956
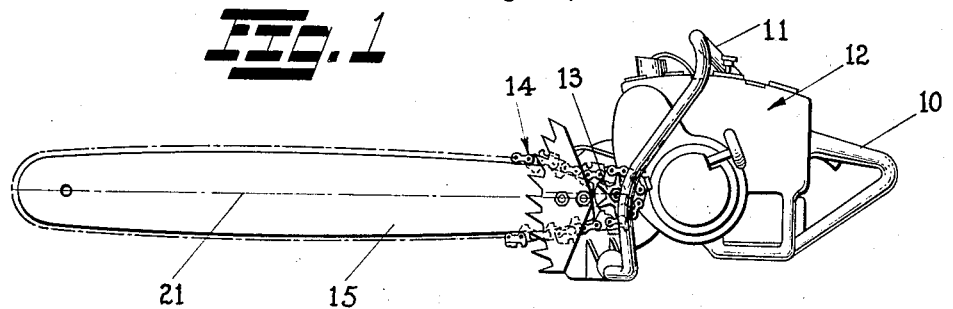
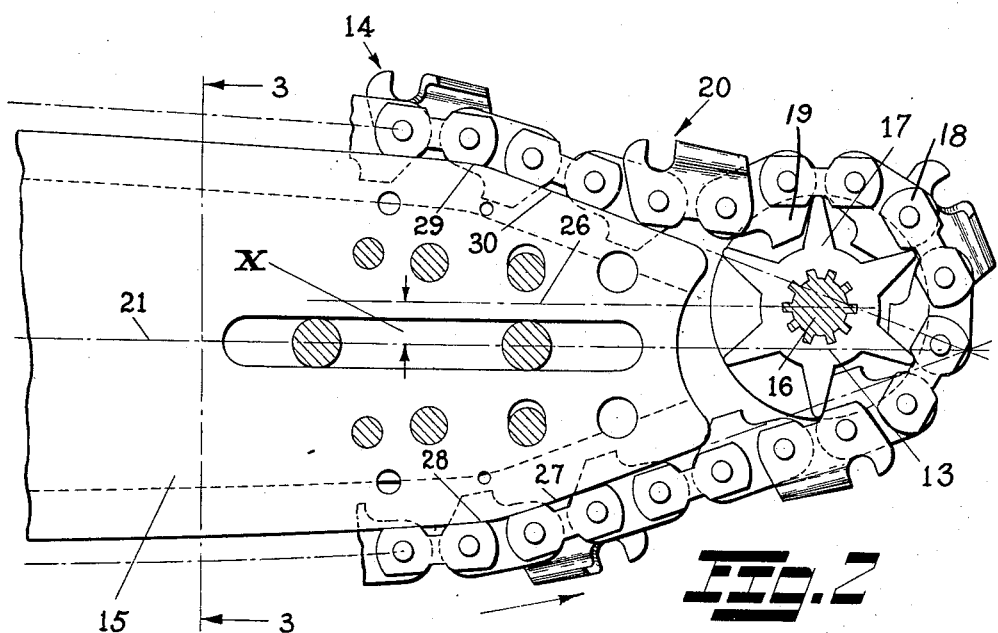
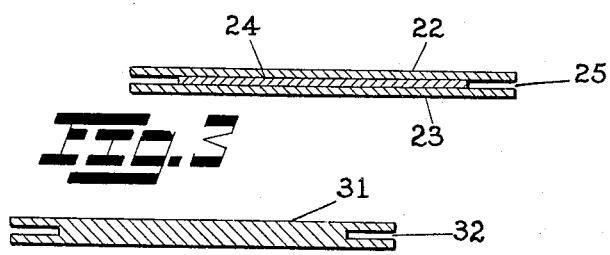
INVENTOR.
HENRY G. HUTCHINSON
BY
ATTORNEY United States Patent Office 2,845,967
Patented Aug. 5, 1958

2,845,967
GUIDE BAR FOR CHAIN SAWS

Henry G. Hutchinson, Thomaston, Conn., assignor, by mesne assignments, to Draper Corporation, a corporation of Maine Application August 30, 1956, Serial No. 607,184

3 Claims. (Cl. 143—32)

This invention pertains to guide bars for chain saws, and more particularly, to improvements therein which permit the chain to run to and from the bar and sprocket more efficiently.

It is an object of the invention to devise a guide bar for a chain saw which shall be so formed as to guide the saw chain to and from its sprocket in a smoother flow and without abruptly altering the natural pathway of the chain passing to and from the sprocket.

A further object is that of providing a bar which will guide the chain in a pathway such that there shall be a minimum of wear on either the bar or chain and in which bouncing and chattering of the chain shall be greatly reduced.

Another object is that of providing a bar symmetrical about its longitudinal center line which may be reversed after a period of operation and which will present the advantages above noted.

A further object is that of devising a guide bar having the characteristics herein described but which will also permit sprockets of different pitches and diameters to be used with it and with which the flow of the chain will not be adversely affected as the bar is moved relatively to the sprocket to adjust the tension of the chain.

Other objects will become apparent as this disclosure progresses.

In chain saws the cutting chain is driven by a sprocket and is guided over an elongated guide bar in a manner familiar to those skilled in this art. These guide bars are grooved to receive the guide tongues of the chain and may be held in an adjusted position relative to the sprocket so that the chain may pass freely from the sprocket to the bar and about that member eventually returning to the sprocket. While the invention will be specifically described by reference to that type of bar and chain, it is to be understood that it applies equally to guides which are not grooved, but wherein the tongues or other projections at the chain are so disposed as to straddle the bar. These saws run at very high speeds and while the chain approaches and runs onto the sprocket tangentially, it behaves as do all high speed chains in leaving the sprocket. It tends to maintain its curvature of travel as generated by the sprocket and thus, rather than passing tangentially from it to the first point of guidance at the bar, the chain then has to make a reverse curve before assuming its natural pathway about the bar. If not compensated, this gives rise to wear of both chain parts and that area of the bar at which the chain impinges. This also sets up a bouncing action which gives rise to hammering and chattering all of which detract from both performance and life to be expected from the parts.

Attempts have been made to devise a bar to take care of this reverse curve in the chain, but without complete satisfaction, since all have been adapted to use with one sprocket, do not contemplate the change of conditions due to adjusting a chain and some cannot be reversed thereby cutting the possible bar life to approximately 50% of what it should have been.

According to the instant invention, a guide bar of generally conventional form is modified at its end adjacent the sprocket so as to be reversible, but also to present chain guiding and receiving surfaces disposed at a converging angle, substantially straight, and which, either in conjunction with or without using a predetermined offset of the guide center line with respect to that of the sprocket, will function with optimum efficacy throughout a wide range of adjustment and with sprockets having five, six, seven or more teeth.

The invention will be described in greater detail by reference to one specific embodiment thereof as illustrated in the accompanying figures of drawing, wherein:

Fig. 1 is a side elevation of a chain saw to which the invention is applied.

Fig. 2 is a view to a larger scale showing details of the invention.

Fig. 3 is a section taken at 3—3, Fig. 2.

Fig. 4 is a similar section through another form of bar to which the invention also applies.

Referring to Fig. 1, a chain saw is shown having among other parts, a frame with gripping handles 10 and 11, a tank and motor unit 12 including a gear reduction if provided, and a clutch driving to a sprocket 13. The latter drives a saw chain 14 which passes about a guide bar 15. Since the details of the saw in general are well known, further description in that direction need not be given here.

Referring to Figs. 2 and 3, parts pertinent to the invention are shown in more detail. Sprocket 13 on shaft 16 has teeth 17 which engage the links 18 of the chain 14 and also guiding tongues 19 by which the chain is constrained to run on and conform to the contour of the bar 15. Any suitable cutting chain may be used and when operated at high speed, runs from the bar to the sprocket passing to the teeth thereof tangentially, but is delivered from the sprocket to the bar making a reverse curve as shown at 20.

According to the invention a bar of elongated or other shape is symmetrical about its longitudinal center line 21 and may be of laminated construction as shown in Fig. 3 where side members 22 and 23 are welded to a web 24 leaving a groove 25 about the periphery of the bar. It is held in place by certain bolts or studs and clamping means so that it may be adjusted to and from the sprocket center to govern the running condition of the chain. These chains wear fairly rapidly and thus the bar must be repositioned frequently to maintain proper running conditions.

The general convex curvature along the top and bottom of the bar is, according to a preferred construction, broken adjacent the sprocket end and both the plates and web are angled to converge as shown. Along with this converging end section, the bar is so mounted that its center line 21 is offset to the parallel center line 26 of the sprocket for a space herein designated by $x$. Having in mind a definite offset, and providing for reasonable adjustment of the bar to and from the sprocket the angle of convergence is such that the side 27 if extended would not pass outwardly of a circle taken at the outside diameter of the sprocket to be used. In practice it is better to plan for this line to pass just inwardly of a line tangent to the sprocket at that point with the bar in its nearest position from the sprocket.

Then the chain in passing to the sprocket will pass about a rounded section 28 where the break or transition from the convex to the straight contour starts and will either just follow along the surface 27 or diverge slightly from it.

The preferred form which the invention takes contemplates the offsetting as above described, but however, the advantages are still attained in a great measure with the sprocket and bar center lines coinciding. With such an arrangement of parts, there may not be as great a possibility of adjustment.

At the opposite side, due to the convergence and offset, if employed, the chain is positively guided by the sprocket and at the rounded section 29 corresponding to that at 28. Between these, it makes its reverse bend 20 and the chain is free to curve as it will but does make contact with the relatively straight side 30 at a point more or less midway of the side, the particular point depending upon the chain tension, the position of the guide bar, the sprocket diameter and the speed of the chain. It makes contact with the bar without shock or pounding and the flow of the chain is thus rendered as smooth as practicable with a great decrease in wear of the various parts.

When the guide bar is mounted substantially on center with the sprocket, the convergence is such that the chain coming from the sprocket makes its reverse curve and engages the inclined, relatively straight side 30 more or less tangentially. It will engage at a point near the central part of that surface so that the flow from sprocket to bar becomes relatively smooth and while something may be lost by way of cutting down the range of adjustment, many saws are run with the bar in this position.

When the bar has been used for considerable time and shows wear at the cutting side or at other critical areas, it may be reversed, thus bringing relatively unworn, critical surfaces into play. This reversal will in no way affect the geometry of the bar end relative to the sprocket or of the chain flow to and from the bar to the sprocket. Likewise, adjustment of the bar or change to a slightly larger sprocket has no adverse effect.

The converging end guide sections 27 and 30 have been referred to as substantially straight. As a practical matter they should be so formed, but a slight curvature either intended or accidental due to manufacturing tolerances is to be understood to be contemplated. While the amount of offset $x$ may be varied to an extent, for small saws with a guide bar length of approximately 2 feet, an offset of ⅛ to ⅜ inches has been found to function satisfactorily. Of course, bars of widely differing sizes will be dimensioned more or less proportionately.

The invention applies equally to a solid (non-laminated) bar such as shown at 31, Fig. 4. A groove 32 cut around the bar periphery serves the same purpose as that at 25. In the event a straddle mounted chain is used, of course there is no groove in the bar, but the invention is readily applicable.

Each converging side 27 and 30 makes an angle of 20° to the center line 21 and while that angle has been found very satisfactory in practice, the invention is by no means limited thereto. Reasonable variations in the angle are contemplated and in some particular installations may be found desirable. The angle may range from 10° to 35° and for reversibility of the guide, it should be symmetrically disposed about its center line as above described, but, of course, small variations between one side and the other may be tolerated although not desired.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. In a chain saw, the combination of a saw chain, a sprocket over which said chain is passed and by which it is driven and a chain guide bar by which said chain is guided as it passes to and from said sprocket, said guide bar being of substantially symmetrical form at either side of its longitudinal center line and mounted in the saw with said center line offset away from a center line of the sprocket parallel to the center line of the bar and toward that side at which the chain is approaching the sprocket, those curved portions of the guide bar adjacent the sprocket being angularly broken to present substantially rectilinear, chain guiding ends converging at an angle such that when the bar is thus offset and in operative relationship to the sprocket, both the said ends, if extended, are confined within lines from the outer edge of the bar and tangent to the sprocket.

2. In a chain saw, the combination of a saw chain, a sprocket over which said chain is passed and by which it is driven and a chain guide bar by which said chain is guided as it passes to and from said sprocket, said guide bar being of substantially symmetrical form at either side of its longitudinal center line and mounted in the saw with said center line offset away from a center line of the sprocket parallel to the center line of the bar and toward that side at which the chain is approaching the sprocket, those curved portions of the guide bar at its end adjacent the sprocket being modified to converge at an angle such that when the bar is thus offset and in operative relationship to the sprocket, that side at which the chain approaches the sprocket, if projected, will fall just inside a tangent to the sprocket and that side by which the chain is guided as it passes from the sprocket, when projected, will approach much closer to the sprocket center line than to a tangent to the sprocket so as to permit the chain to move from sprocket to bar in a smoothly flowing reverse curve.

3. Mechanism as defined in claim 1 wherein the substantially straight, converging guide portions of the bar are disposed at an angle to the bar center line of substantially 20°.

References Cited in the file of this patent

UNITED STATES PATENTS

| | | |
|---|---|---|
| 2,351,740 | Blum | June 20, 1944 |
| 2,599,608 | Bye | June 10, 1952 |
| 2,765,821 | Strunk | Oct. 9, 1956 |